United States Patent Office 3,337,531
Patented Aug. 22, 1967

3,337,531
MICROBIOLOGICALLY ACTIVE QUATERNARY
AMMONIUM COMPOUNDS
Reginald L. Wakeman, Philadelphia, Pa., and Joseph F. Coates, Washington, D.C., assignors, by mesne assignments, to Millmaster Onyx Corporation, New York, N.Y., a corporation of New York
No Drawing. Filed Apr. 15, 1964, Ser. No. 360,117
4 Claims. (Cl. 260—215)

The object of the present invention is the preparation of microbiologically active, relatively water-insoluble compounds by reaction of certain quaternary ammonium hydroxides or their water-soluble salts with cellulose sulfuric acids or their water-soluble salts.

The products of this invention conform, in general, with the following structure:

$$HO(C_6H_{10}O_5 \cdot nSO_3Z)_xH$$

wherein Z is the cation of a microbiologically active quaternary ammonium compound; $n$ is any number ranging from a fractional part of 1 to 3.0; and $x$ is a very large number representing the degree of polymerization characteristic of the celluloses.

The chemistry of cellulose sulfates is known to the art and is treated in, among other sources, volume V "cellulose Derivatives" of the High Polymer Monographs published by Interscience Publishers, Incorporated (1943, page 663 et seq.). The sulfuric acid esters of cellulose are stated therein to approach a maximum substitution of 3.0 sulfuric groups per glucose anhydride unit, but many lower degrees of substitution are reported to have been obtained, depending on the elapsed time of esterification and the sulfuric acid concentration.

Typical examples of the quaternary ammonium compounds which may be used in this invention are the alkyl trimethyl ammonium chlorides, alkyl-benzyl trimethyl ammonium chlorides, alkyl dimethyl benzyl ammonium chlorides, alkyl dimethyl menaphthyl ammonium chlorides, alkyl dimethyl substituted-benzyl ammonium chlorides in which the benzyl radical is substituted with one or more side chains containing from 1 to 5 carbon atoms such, for example, as methyl, dimethyl, ethyl and the like and in which the carbon atoms may all be in the same or different side chains or in which the benzyl radical bears one, two or more halogen atoms such as chlorine or bromine, alkyl pyridinium chlorides, alkyl isoquinolinium chlorides and bromides, alkyl lower-alkyl pyrrolidinium chlorides, alkyl lower-alkyl morpholinium chlorides in all of which the alkyl group may have from 8 to 22 carbon atoms and the lower-alkyl group may have from 1 to 4 carbon atoms and alkyl phenoxy ethoxy ethyl dimethyl benzyl ammonium chloride in which the alkyl radical may be iso-octyl or nonyl and in which the phenyl radical may, if desired, be substituted by a methyl radical. Various other analogs of these quaternaries may also be employed such, for example, as cetyl dimethyl ethyl ammonium bromide or oleyl dimethyl ethyl ammonium bromide.

In general, the quaternary ammonium compounds useful in this invention are the higher alkyl quaternary ammonium hydroxides, halides (chlorides and bromides), sulfates, methosulfates and the like possessing the following formula:

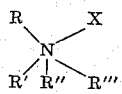

where R is an alkyl or alkaralkyl radical containing from 8 to 22 carbon atoms or an alkyl phenoxy ethoxy ethyl radical in which R is an alkyl radical containing from 8 to 9 carbon atoms and in which the phenyl radical may be substituted by a methyl group; R′ and R″ are methyl or ethyl radicals or members of a heterocyclic ring system such as pyridine, isoquinoline, pyrrolidine and morpholine; R‴ is a methyl radical or a benzyl group or a substituted-benzyl group such, for example, as a monochlorobenzyl radical or a dichlorobenzyl radical or mixture thereof or a methyl benzyl, dimethyl benzyl, ethyl benzyl, diethyl benzyl, isopropyl benzyl, tertiary butyl benzyl or another benzyl radical containing from 1 to 5 carbon atoms as side chains, either as a single side chain or a multiplicity of side chains including mixtures thereof or a menaphthyl group or hydrogenated menaphthyl group. When R′ and R″ are members of a morpholine or pyrrolidine ring, R‴ is a methyl, ethyl, propyl or butyl group. When R′ and R″ are members of an unsaturated heterocyclic ring such as pyridine or isoquinoline, R‴ is the same radical as R″. X in the above formula corresponds to a halide radical such as chloride, bromide or iodide or to any other water-soluble anion such as methosulfate.

In general, we prefer to use such quaternary ammonium compounds which have a phenol coefficient of at least 100 with respect to both *Staphylococcus aureus* and *Salmonella typhosa* at 20° C. when determined by the standard method given in the "Official Methods of Analysis of the Association of Official Agricultural Chemists," ninth edition (1960), page 63 et seq.

The compounds of this reaction may be prepared by mixing aqueous solutions of the quaternary ammonium hydroxides or salts with an aqueous solution of the cellulose sulfuric acids or any of their water-soluble salts.

After thorough mixing, the organic product separates as a precipitate which may be more or less fibrous in nature, depending on the degree of sulfation, the quality of the agitation, the rate of addition, etc. The product may then be recovered, as by filtration and washing, or by decantation and leaching, followed by filtration, after which it may be air or vacuum dried.

The product may be used, if desired, without drying since any entrapped water is irrelevant to the microbiological activity of the compounds. In other applications, removal of water may be essential for reasons not related to biological activity.

An alternative method for the preparation of compounds especially applicable to the treatment of fabric, ropes, net, woven and non-woven fabric and reticulated or convoluted materials, involves a two-step process. In the first step, the material is passed through a bath containing the anionic moiety. Excess solution is removed by methods well known to those skilled in the art. The treated material is then passed through a second bath wherein the concentration of quaternary ammonium compound is such that the material pickup will result in an equivalent amount of quaternary ammonium compound reacting with the anionic moiety, depositing the product in the most intimate way on the surface and in the interstices, convolutions and reticulations of the material.

The method of adjustment of solution concentration to achieve the required pickup is well known to those skilled in the art. The order of treatment may be reversed without affecting the biological activity or durability of the product on the material. The products of this invention may be formulated as water dispersions by dissolving them in a water miscible organic solvent such as acetone or methanol and diluting with water or by dissolving them in emulsifiable oils such, for example, as sulfonated castor oil or pine oil and diluting with water. In preparing aqueous dispersions, emulsifying agents such, for example, as ethylene oxide condensates of alkyl phenols may be used with or without organic solvents.

It is surprising that the compounds of this invention exhibit high microbiological activity despite their relative insolubility in water. Because of their unusual combination of physical and microbiological properties, they can be used to impart laundry-resistant anti-microbial characteristics to textiles. They can also be used as the active agent in antimildew finishes for textiles which are resistant to leaching with water.

The products may be shredded or otherwise subdivided if this proves desirable in their application; or they may be tabletted or briquetted for introduction into water for slow and gradual leaching. For example, they could be used thus to prevent the growth of bacteria, algae and other microorganisms in water to be recirculated, as in cooling towers, air conditioners and humidifiers; or to prevent the growth of slimes, sulfate reducing bacteria and other microorganisms which tend to clog the interstices of oil-bearing sands when water or brine is used for displacement in secondary oil recovery; and similar or related applications. Also, they can be applied in subdivided form to the surface of the soil to prevent the killing of seeds or seedlings by fungal growths.

It will be understood that the properties of the products described herein will vary depending upon the nature of the cationic quaternary ammonium compound used in their preparation as well as the anionic compound reacted therewith.

The chemical, physical and biological properties of the products of our invention make them especially appropriate for the following applications when suitably incorporated in active amounts in an appropriate vehicle, binder, medium or substrate:

(1) Mildewproofing fabric, canvas, ropes, textiles, awnings, sails, tenting and other woven and non-woven reticulated materials.
(2) Paint mildewstats.
(3) Odor preservative agents for clothes and shoes.
(4) Mildew retardant and odor suppressant for shoes and other leather products.
(5) Disinfection agents for hair and gut of man and beast.
(6) Surface finishes for stone, plaster, tile, cement, brick and other inorganic building materials to retard growth of microorganisms, fungi, mold and algae.
(7) Wool preservative.
(8) Plant and tree spray to combat fungi.
(9) Antimycotic agents for soap wrappers.
(10) Self-sanitizing brushes.
(11) Mildewproofing agent in and on plastic and film.
(12) Mildewproofing of cellulosics, cardboard, fibreboard, paper and cordage.
(13) Contact biostat for application to film, waxes and cloth to preserve cheese, meats and vegetables and other food products.
(14) Algal inhibition.
(15) Sanitizing agent for rug, carpet, curtains.
(16) Additives for soap and for both anionic and nonionic detergents in liquid, bar, powder, bead, solution and other forms to impart bacteriostatic and fungistatic properties thereto.
(17) Algastat and bacteriostat for recirculated waters, as in cooling towers, air conditioners and humidifiers.
(18) Bacteriostat and algastat for addition to flood waters and brines in secondary oil recovery.
(19) Fungistat for treatment of soil to prevent damping-off.

The microbiological activity of our compounds has been evaluated microbiologically by means of the Agar Surface Plate Test, a variation of the Agar Cup-Plate Method which is fully described in "Antiseptics, Disinfectants, Fungicides and Chemical and Physical Sterilization" by George F. Reddich (Lea & Febiger, 1957) pages 197–200. Briefly, agar plates are prepared and inoculated with the selected microorganisms and the material to be tested is placed in intimate contact with the agar in an area about 2 cm. in diameter. The plate is then incubated for 24 hours at 37° C. A clear zone of agar surrounding the material being tested indicates inhibitory activity against the specific organism.

In order to eliminate the possibility that some of the soluble quaternary ammonium germicides employed in the preparation of the cellulose sulfate derivatives might have been occluded in the insoluble product and released during the test by diffusion, the products were mixed with water and allowed to stand for some time with occasional agitation in order to leach out any of the more soluble substances, refiltered and washed and dried, and then retested by the Agar Surface Plate Test. These results were the same as those cited below.

This invention is illustrated by, but not restricted to, the following examples:

Example I

An aqueous stock solution was prepared containing 13 g. per liter of sodium cellulose sulfate which assayed 0.55 sulfuric acid groups per glucose anhydride unit. A one liter aliquot of this solution containing 0.060 equivalent weights of the product was reacted with vigorous agitation with a chemically equivalent amount of a solution of a commercial grade of alkyl dimethyl ethyl-benzyl ammonium chloride (Onyx Chemical Corporation's "BTC–471" in which the alkyl distribution is 50% $C_{12}$, 30% $C_{14}$, 17% $C_{16}$, 3% $C_{18}$). The precipitated alkyl dimethyl ethyl-benzyl ammonium cellulose sulfate was filtered off and washed thoroughly. After vacuum drying it was recovered as a fibrous mat which could be easily shredded.

When tested by the Agar Plate Method described above, a 4 mm. zone of inhibition was observed against *Staphylococcus aureaus* and a 3 mm. zone of inhibition against *Salmonella typhosa*.

Example II

One liter of the stock solution of sodium cellulose sulfate of Example I was reacted in the same manner with a chemically equivalent amount of a solution of a commercial grade of alkyl dimethyl benzyl ammonium chloride (Onyx Chemical Corporation's "BTC–824" in which the alkyl distribution is 60% $C_{14}$, 30% $C_{16}$, 5% $C_{12}$, 5% $C_{18}$). The precipitate was filtered, washed thoroughly and dried to a mat of fibrous material of alkyl dimethyl benzyl ammonium cellulose sulfate.

When tested by the Agar Plate Method described above, an 8 mm. zone of inhibition was observed against *Staphylococcus aureus* and a 6 mm. zone against *Salmonella typhosa*.

Example III

A one liter aliquot of the solution of sodium cellulose sulfate of Example I was reacted similarly with a chemically equivalent amount of a solution of a commercial grade of alkyl isoquinolinium chloride (Onyx Chemical Corporation's "Isothan Q–75" in which the alkyl distribution is 50% $C_{12}$, 30% $C_{14}$, 17% $C_{16}$, 3% $C_{18}$). The product, alkyl isoquinolinium cellulose sulfate, was recovered in fibrous form by filtration, washing and drying.

When tested by the Agar Plate Method described above, a 3 mm. zone of inhibition was observed against both *Staphylococcus aureus* and *Salmonella typhosa*.

We claim:
1. Alkyl dimethyl ethyl-benzyl ammonium cellulose sulfate having a degree of substitution of about 0.55 to 3.
2. Alkyl dimethyl benzyl ammonium cellulose sulfate having a degree of substitution of about 0.55 to 3.
3. Alkyl isoquinolinium cellulose sulfate having a degree of substitution of about 0.55 to 3.
4. A microbiologically active quaternary ammonium cellulose sulfate having a degree of substitution of about 0.55 to 3, and wherein the quaternary ammonium cation has at least one alkyl group of from 8 to 22 carbon atoms attached to the nitrogen and possesses a phenol coefficient of at least 100 with respect to *Staphylococcus aureus* and *Salmonella typhosa* at 20° C.

References Cited

UNITED STATES PATENTS

| 2,380,877 | 5/1954 | Shelton | 167—22 |
| 2,702,774 | 2/1955 | Stayner | 167—22 |
| 2,768,162 | 10/1956 | Evans | 260—231 |
| 2,931,753 | 4/1960 | Chesbro | 167—22 |

DONALD E. CZAJA, *Primary Examiner.*

LEON J. BERCOVITZ, *Examiner.*

R. W. MULCAHY, *Assistant Examiner.*